(12) United States Patent
Sun et al.

(10) Patent No.: US 12,485,444 B2
(45) Date of Patent: Dec. 2, 2025

(54) EFFICIENT GENERATION AND PERFORMANCE EVALUATION DEVICE OF FOAM UNDER HIGH TEMPERATURE AND HIGH PRESSURE

(71) Applicant: Southwest Petroleum University, Chengdu (CN)

(72) Inventors: Jie Sun, Chengdu (CN); Ziqiang Wang, Chengdu (CN); Jiaqiang Jing, Chengdu (CN); Junwen Chen, Chengdu (CN); Ran Yin, Chengdu (CN); Xiaoyun Yin, Chengdu (CN); Wen Zhang, Chengdu (CN); Yu Zhu, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 114 days.

(21) Appl. No.: 18/419,605

(22) Filed: Jan. 23, 2024

(65) Prior Publication Data
US 2024/0424511 A1    Dec. 26, 2024

(30) Foreign Application Priority Data
Jun. 26, 2023    (CN) .......................... 202310753143.9

(51) Int. Cl.
*B05B 12/00*    (2018.01)
*B05B 7/00*    (2006.01)

(52) U.S. Cl.
CPC .......... *B05B 12/004* (2013.01); *B05B 7/0025* (2013.01)

(58) Field of Classification Search
CPC ... B05B 7/0018; B05B 7/0025; B05B 12/004; A62C 5/02; A47K 5/14; Y10S 261/26
See application file for complete search history.

(56) References Cited

PUBLICATIONS

CNIPA, Notification of First Office Action for CN202310753143.9, Nov. 21, 2024.
Southwest Petroleum University (Applicant), Replacement claims (allowed) of CN202310753143.9, Nov. 22, 2024.
CNIPA, Notification to grant patent right for invention in CN202310753143.9, Jan. 14, 2025.

*Primary Examiner* — Christopher R Dandridge
(74) *Attorney, Agent, or Firm* — JEEN IP LAW, LLC (57) ABSTRACT

An efficient generation and performance evaluation device of foam under high temperature and high pressure is provided, the device includes: a reaction kettle, a water bath thermostatic box, a porous hollow steel circular plate, a rotator, a multilayer spiral steel wire mesh, a spring hinge, a gas diffuser with vortex shape, a light-emitting diode (LED) lamp, valves, a screw pump, a pressure transmitter, a temperature transmitter, a fluid reservoir, a gas reservoir and a data collection and analysis device. The device determines a foamability and stability of the foam by injecting foam solution and gas into the reaction kettle, observing a foaming volume and a half-life period of the foam after the gas in full contact with the foam solution to generate the foam, and the device can determine oil resistance and salt resistance of the foam under high temperature and high pressure.

5 Claims, 5 Drawing Sheets

EFFICIENT GENERATION AND PERFORMANCE EVALUATION DEVICE OF FOAM UNDER HIGH TEMPERATURE AND HIGH PRESSURE

TECHNICAL FIELD

The disclosure relates to the field of applications of reaction kettles, and more particularly to a multifunctional efficient generation and performance evaluation device of foam under high temperature and high pressure.

BACKGROUND

As a porous film dispersion system, foam is widely applied in fields such as oil drilling, profile control, water plugging, and oil recovery. There are many kinds of regents that can generate the foam, and most of foam solution are compounded by a variety of surfactants and polymer reagents at present. Characteristics of the foam in a compound system are unknown, therefore, it is necessary to study foamability and stability of the foam under different conditions.

A current study for the foamability and the stability of the foam is mainly to observe a foaming volume and a half-life period of the foam, which requires the foam to be generated as efficiently as possible. It can be seen from a structure of the foam, the foam is mainly formed by a liquid film wrapped with gas, in order to generate as much foam as possible, it is necessary to think about how to make the gas and liquid in full collision and contact.

When the foaming volume and the half-life period of the foam are determined, the foam solution is usually put into a high-speed mixer, and after the mixing is complete, the foam is poured into a graduated container for reading the foaming volume and the half-life period of the foam. However, the foam is a thermodynamic unstable system, which begins to decay from the moment it is generated, and changes of environments have a great effect on generation and stability of the foam. Therefore, it is necessary to control temperature and pressure during determination process and avoid evaporation, which requires controlling a consistency of the environment before and after generation of the foam as much as possible, so as to ensure relative accuracy of the determination. However, a study on foamability and stability of the foam under a certain pressure has certain challenges, and how to effectively control stability of the pressure is a key to study effect of the pressure on the foam.

Meanwhile, when the foam is applied in the fields such as the oil drilling, the oil recovery and oil-gas migration, the environment is usually extreme, high-temperature, high-salinity and oil content will have a great effect on the generation and stability of the foam, which needs to study oil resistance, salt resistance and temperature resistance of the foam, so as to provide a medium with a good performance.

Therefore, the disclosure designs an efficient generation and performance evaluation device of foam under high temperature and high pressure, which can be used as an efficient generation device of the foam for experimental research or on-site applications.

SUMMARY

A purpose of the disclosure is to provide an efficient generation and performance evaluation device of foam under high temperature and high pressure, which can observe a foaming volume and a half-life period of the foam after generating the foam, evaluate oil resistance, salt resistance and temperature resistance of the foam, and be used as an efficient generation device of the foam.

In order to achieve the above functions, technical solutions of the disclosure are as follows.

An efficient generation and performance evaluation device of foam under high temperature and high pressure is provided, and the efficient generation and performance evaluation device includes: a reaction kettle, a temperature resistant silicone rubber sealing ring, screws, a water bath thermostatic box, a porous hollow steel circular plate, a rotator, a connection column, a bearing, a multilayer spiral steel wire mesh, spring hinges, semicircular pieces, a gas diffuser with vortex shape, a light-emitting diode (LED) lamp, valves, a screw pump, a pressure transmitter, a temperature transmitter, a liquid storage tank, a gas storage tank and a data collection and analysis device; and the valves include: a first valve, a second valve and a third valve.

The reaction kettle includes: an upper kettle cover and a lower kettle cover. A side wall of the reaction kettle includes an outer side wall, a water bath insulation layer and an inner side wall. The outer side wall and the inner side wall are fixedly connected to the upper kettle cover and the lower kettle cover, and the water bath insulation layer is disposed in a gap between the outer side wall and the inner side wall. An upper middle part of the outer side wall defines a circular hole J, and a lower middle part of the outer side wall defines a circular hole I. The circular hole I is taken as a liquid inlet hole, and the circular hole J is taken a liquid outlet hole. The circular hole I and the circular hole J penetrate through the outer side wall, and are connected to the water bath thermostatic box. When a temperature of the water bath thermostatic box is set to a first target temperature, a temperature of liquid filled in the water bath thermostatic box is gradually changed. When a circulation function of the water bath thermostatic box is opened, the liquid filled in the water bath thermostatic box circulates between the water bath thermostatic box and the water bath insulation layer to change a temperature in the reaction kettle. A material of the outer side wall is stainless steel, a material of the inner side wall is quartz, and the inner side wall and the outer side wall have high pressure bearing capacity.

A part of the outer side wall is extended to the inner side wall to be in seamless contact with the inner side wall, to thereby define a first groove, a tick mark is disposed in the first groove and the tick mark is configured to observe a foaming height of the foam in the reaction kettle. Another part of the outer side wall is extended to the inner side wall to be in seamless contact with the inner side wall, thereby to define a second groove symmetrical to the first groove, and the LED lamp is configured to illuminate the first groove through the second groove to observe a foaming volume in the tick mark. Materials in the first groove and the second groove are quartz.

The rotator is disposed above the upper kettle cover, and is relatively fixed with the porous hollow steel circular plate in the reaction kettle, and the rotator is connected to the porous hollow steel circular plate through an inner cylinder of the connection column. The connection column includes: the inner cylinder and an outer ring, and a gap is defined between the inner cylinder and the outer ring, and is configured to flow gas into the gas diffuser. An outer side of the outer ring is welded to a center of the upper kettle cover of the reaction kettle. The bearing is disposed in the rotator, an upper end of the inner cylinder is connected to the bearing in the rotator, and a lower end of the inner cylinder is connected to the porous hollow steel circular plate. The inner cylinder, the rotator and the porous hollow steel circular plate are relatively fixed, and the rotator is configured to drive the inner cylinder and the porous hollow steel circular plate to rotate together.

The porous hollow steel circular plate is divided into an inner circular plate and a fixing ring according to a circular surface of the porous hollow steel circular plate, and a boundary between the inner circular plate and the fixing ring adopts a sealed and rotatable connection. An outside of the fixing ring is completely sealed and fixed with the inner side wall of the reaction kettle without liquid leakage. The multilayer spiral steel wire mesh is disposed in the inner circular plate, the inner circular plate defines multiple circular holes H, and the multiple circular holes H penetrate through the inner circular plate. Sides of the multiple circular holes H on a bottom of the inner circular plate are respectively fixed with the spring hinges, the spring hinges are respectively connected to the semicircular pieces, and the semicircular pieces are disposed below the multiple circular holes H of the inner circular plate. The semicircular pieces are configured to seal the circular holes H on the bottom of the inner circular plate when there is no gas flow, and the semicircular pieces are configured to be flipped downwards under an impact of the gas.

A top of the rotator defines a circular hole D, the circular hole D is connected to the gas storage tank, and connected to the gap between the inner cylinder and the outer ring. The connection column defines a circular hole F on a middle lower end of the gap. The gas diffuser is disposed above the porous hollow steel circular plate, and is fixed with the porous hollow steel circular plate, the gas diffuser can be rotated with the porous hollow steel circular plate together in a relative static condition. The gas diffuser defines a circular hole E, and the multiple circular holes G and the multiple circular holes H are defined in a same vertical direction. The gas flows into the gas diffuser from the gap of the connection column through the circular hole F and the circular hole E sequentially, and the gas flows out from the multiple circular holes G of the gas diffuser. The gas flowing out from the multiple circular holes G can enter the porous hollow steel circular plate through the multiple circular holes H, and the gas can burst open the semicircular pieces connected to the spring hinges on the bottom of the porous hollow steel circular plate when the pressure reaches a certain degree.

An upper end of the side wall of the reaction kettle defines a circular hole C, and the circular hole C is connected to the liquid storage tank, the screw pump is disposed between the circular hole C and the liquid storage tank, foam solution can be injected into the reaction kettle through the screw pump and flow to the porous hollow steel circular plate, and the foam solution flows from the circular hole F into the porous hollow steel circular plate. An upper middle part of the side wall of the reaction kettle defines a circular hole B for exhaust, and controlling a pressure in the reaction kettle. A lower part of the side wall of the reaction kettle defines a circular hole A, the circular hole A is at a same height as a top end of the lower kettle cover of the reaction kettle, and the circular hole A is configured to discharge the foam and the foam solution.

Hoses are used to connect the circular holes, and to connect the circular holes and the screw pump.

Through using the efficient generation and performance evaluation device of the foam under high temperature and high pressure, the foam can be efficiently generated, the foaming volume and the half-life period of the foam under the high temperature and high pressure can be observed, the oil resistance and the salt resistance of the foam can be determined, and the efficient generation and performance evaluation device of the foam can be used as an efficient generation device of the foam.

Before starting determination, the temperature of the water bath thermostatic box is set, a circulation function of the water bath thermostatic box is opened, and liquid filled in the water bath thermostatic box circulates between the water bath thermostatic box and the water bath insulation layer. After opening the circular hole D and the circular hole C, the foam solution and the gas enter the reaction kettle at the same time, the foam solution enters the porous hollow steel circular plate through the circular hole F; and the gas flows from the gas storage tank into the gas diffuser through the circular hole D, the gap of the connection column, the circular hole F, and the circular hole E sequentially, then the gas from the gas diffuser enters the porous hollow steel circular plate through the multiple circular holes G and the multiple circular holes H. After the foam solution and the gas flows into the porous hollow steel circular plate, the rotator is opened, the porous hollow steel circular plate and the gas diffuser rotate together, the gas is in full contact with the foam solution in the multilayer spiral steel wire mesh to generate a large amount of foam. The semicircular pieces on the spring hinges of the bottom of the inner circular plate are opened when reaching a certain pressure, the gas collides with the foam solution under a high flow speed to generate foam, and the foam falls evenly to the bottom of the reaction kettle, and the semicircular pieces are automatically closed under tensions of the spring hinges after closing a valve C connected to the gas storage tank. The circular hole B is opened for exhaust, to thereby stabilize the pressure at a certain value.

After the foam solution is completely injected, and when the foaming volume no longer increases, the valve C connected with the rotator and the circular hole D are closed, the foaming volume is read according to the tick mark. When half of the injected foam solution is separated out, a time is recorded as the half-life period of the foam.

When the oil resistance or the salt resistance of the foam under a certain pressure are evaluated, oil or inorganic salt is mixed with the foam solution as an injection liquid, the temperature of the water bath thermostatic box is set as a first target value, a foaming volume and a half-life period are observed and recorded, to thereby determine the oil resistance or the salt resistance of the foam under the certain pressure. When determinations are finished, the foam in the reaction kettle stands for a period of time, the circular hole A is opened after the foam disappears, to completely discharge the foam solution.

When it is not necessary to determine the performances of the foam but only to obtain a large amount of the foam, the foam base fluid can be continuously added after opening the gas storage tank and the rotator, and then the circular hole A can be opened to continuously discharge the generated foam, and the efficient generation and performance evaluation device of the foam can be used as an efficient generation device of the foam.

The disclosure has the following advantages through adopting the above technical solutions.

1. The foam is a thermodynamic unstable system, which begins to decay from the moment it is produced. In the disclosure, the foam is generated in a closed high-pressure reaction kettle, which can slow down coarsening and coalescence of liquid film due to environmental evaporation and temperature change. Exhaust through the circular hole B, the pressure in the reaction kettle is controlled, foamability and stability of the foam under the conditions of temperature and pressure at a job site can be accurately determined.

2. The multilayer spiral steel wire mesh in the porous hollow steel circular plate can greatly increase a contact area between the gas and the foam solution to generate a large amount of fine and uniform foam. The porous hollow steel circular plate can act as a baffle, and the gas and the foam solution will also collide violently when the gas and foam solution fall to the bottom of the porous hollow steel circular plate. The gas coming out of the gas diffuser can evenly enter various positions on the porous hollow steel circular plate, to make the gas in full contact with the foam solution. The bottom of the porous hollow steel circular plate is provided with multiple spring hinges, and the settings of opening the semicircular pieces on the spring hinges when there is gas flow and closing the semicircular pieces on the spring hinges when there is no gas flow can ensure full contact between the gas and the foam solution, and make the foam fall more evenly on the bottom of the high-pressure reaction kettle.

3. The efficient generation and performance evaluation device of the foam can determine the oil resistance and the salt resistance of the foam under the high temperature and high pressure. After mixing the oil or the inorganic salt with the foam solution, the temperature of the water bath thermostatic box is adjusted to increase a temperature of the water bath insulation layer, and the foaming volume and the half-life period of the foam are observed and recorded after performing same steps as above, to thereby obtain effects of the oil or the inorganic salt on the foaming volume under the high temperature and high pressure. When it is not necessary to determine the performances of the foam but only to obtain a large amount of the foam, the device is used as the efficient generation device of the foam, the foam is generated by continuously adding the foam solution and the gas into the reaction kettle, and the foam is discharged from the circular hole A under the impact of the gas after closing the circular hole B.

LIST OF REFERENCE NUMBER

1—reaction kettle; 101—upper kettle cover; 102—lower kettle cover; 103—screw; 104—outer side wall; 105—water bath insulation layer; 106—inner side wall; 107—bearing; 108—pressure transmitter; 109—temperature transmitter; 110—temperature resistant silicone rubber sealing ring; 2—circular hole A; 3—tick mark; 4—circular hole B; 5—circular hole C; 6—rotator; 7—circular hole D; 8—outer ring; 9—inner cylinder; 10—gas diffuser with vortex shape; 11—circular hole C; 12—multiplayer spiral steel wire mesh; 13—second groove; 14—spring hinge; 15—semicircular piece; 16—boundary between inner circular plate and fixing ring on the porous hollow steel circular plate; 17—circular hole F; 18—connection column; 19—circular hole G; 20—circular hole H; 21—data collection and analysis device; 22—gas storage tank; 23—screw pump; 24—liquid storage tank; 25—light-emitting diode (LED) lamp; 26—valve A; 27—valve B; 28—valve C; 29—valve D; 30—circular hole I; 31—circular hole J; 32—water bath thermostatic box; 33—porous hollow steel circular plate; 331—inner circular plate; 332—fixing ring; 34—first groove.

DETAILED DESCRIPTION OF EMBODIMENTS

The disclosure is further described in conjunction with drawings below.

The disclosure provides an efficient generation and performance evaluation device of foam under high temperature and high pressure. The efficient generation and performance evaluation device of the foam includes: a reaction kettle 1, a temperature resistant silicone rubber sealing ring 110, screws 103, a water bath thermostatic box 32, a porous hollow steel circular plate 33, a rotator 6, a connection column 18, a bearing 107, a multilayer spiral steel wire mesh 12, spring hinges 14, semicircular pieces 15, a gas diffuser with vortex shape 10, a light-emitting diode (LED) lamp 25, valves, a screw pump 23, a pressure transmitter 108, a temperature transmitter 109, a liquid storage tank 24, a gas storage tank 22 and a data collection and analysis device 21, and the valves include a valve A (i.e., a fourth valve), a valve B (i.e., a first valve), a valve C (i.e., a second valve) and a valve D (i.e., a third valve).

Figure 2:
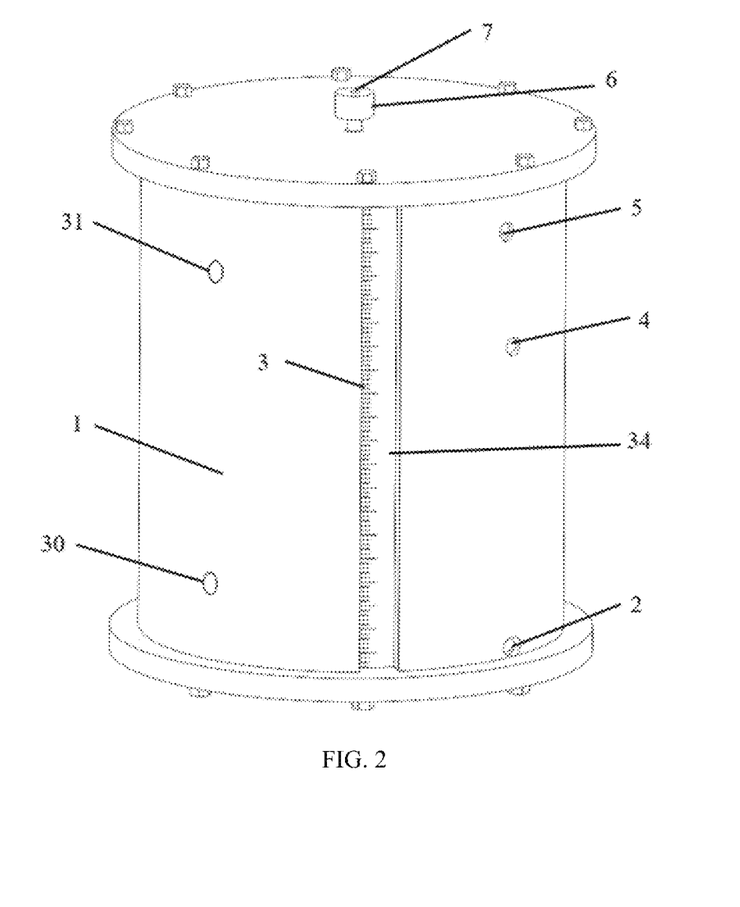
FIG. 2 illustrates a schematic three-dimensional structural diagram of a reaction kettle according to an embodiment of the disclosure.
Figures 3, 4:
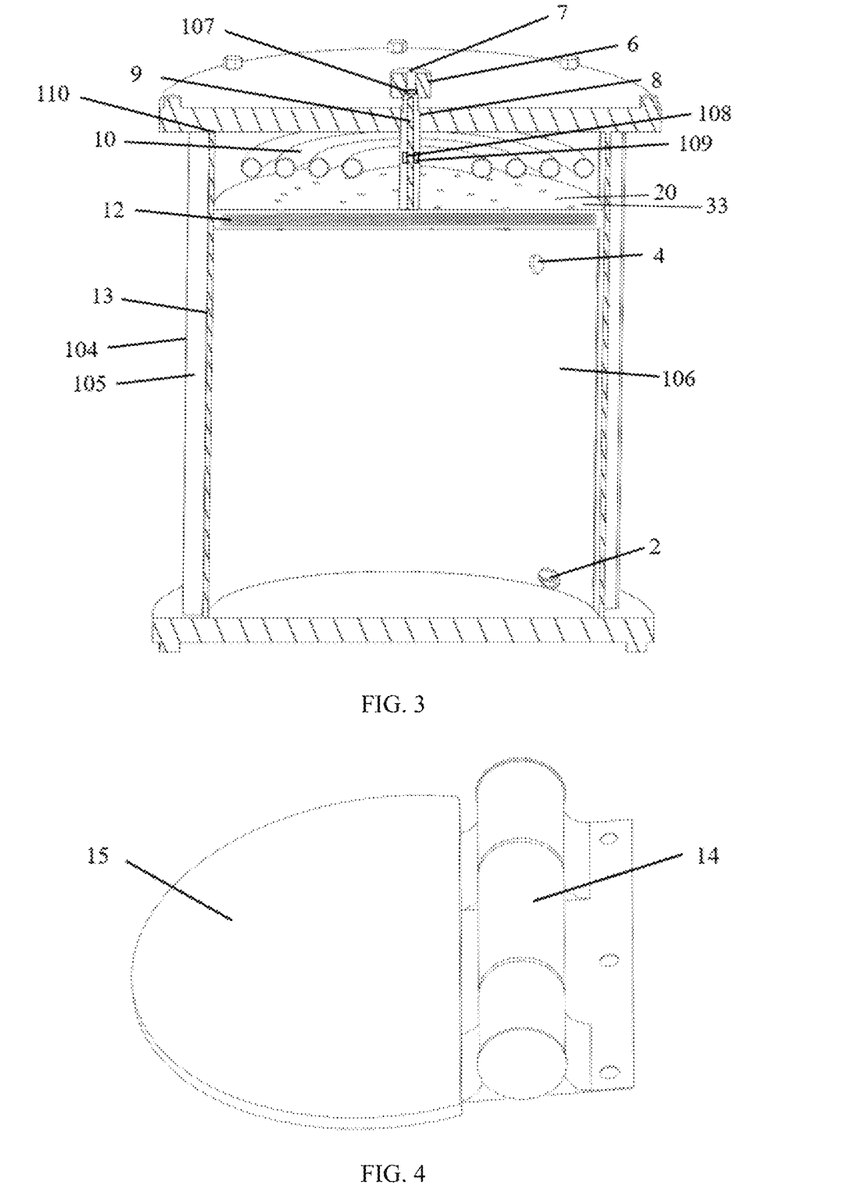
FIG. 3 illustrates a schematic section diagram of the reaction kettle along an axis of the reaction kettle according to an embodiment of the disclosure.
FIG. 4 illustrates a schematic diagram of a connection between a spring hinge and a semicircular piece installed at a circular hole H on a bottom of a porous hollow steel circular plate according to an embodiment of the disclosure.
Figure 5:
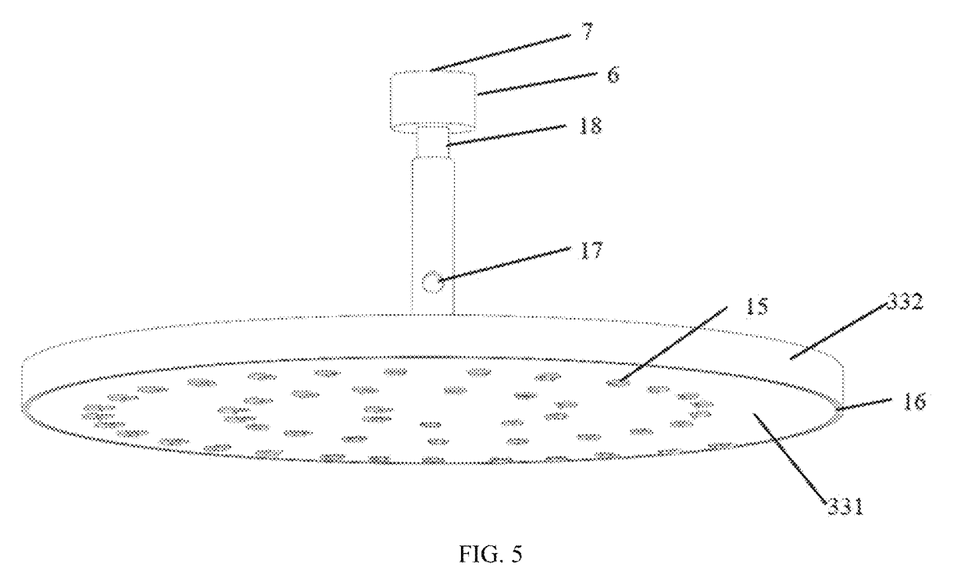
FIG. 5 illustrates a schematic diagram of a connection between a rotator and the porous hollow steel circular plate installed on a top of the reaction kettle according to an embodiment of the disclosure.

As shown in FIG. 2 and FIG. 3, the reaction kettle 1 includes: an upper kettle cover 101 and a lower kettle cover 102. An upper kettle cover 101 of the reaction kettle 1 is sealed with a side wall of the reaction kettle 1 through the temperature resistant silicone rubber sealing ring 110, and the upper kettle cover 101 and a low kettle cover 102 of the reaction kettle 1 are compacted on the side wall of the reaction kettle 1 through the screws 103, to thereby prevent gas leakage. The rotator 6 is disposed above the upper kettle cover 101, and the connection column 18 is disposed below the rotator 6. The connection column 18 includes: an inner cylinder 9 and an outer ring 8, and a gap is defined between the inner cylinder 9 and the outer ring 8, and is configured to flow gas into the gas diffuser 10.

An outer side of the outer ring 8 is welded to a center of the upper kettle cover 101 of the reaction kettle 1, and the outer ring 8 cannot be rotated. The bearing 107 is disposed in the rotator 6, an upper end of the inner cylinder 9 is connected to the bearing in the rotator 6, and a lower end of the inner cylinder 9 is connected to the porous hollow steel circular plate 33. The inner cylinder 9, the rotator 6 and the porous hollow steel circular plate 33 are configured to rotate together in a relative static condition, and the rotator 6 is configured to drive the inner cylinder 9 and the porous hollow steel circular plate 33 to rotate together. The inner cylinder 9 is connected to the temperature transmitter 109 and the pressure transmitter 108, and the temperature transmitter and the pressure transmitter are connected to the data collection and analysis device 21, and are configured to measure a pressure and a temperature in the reaction kettle 1 in real-time, respectively.

Figure 1:
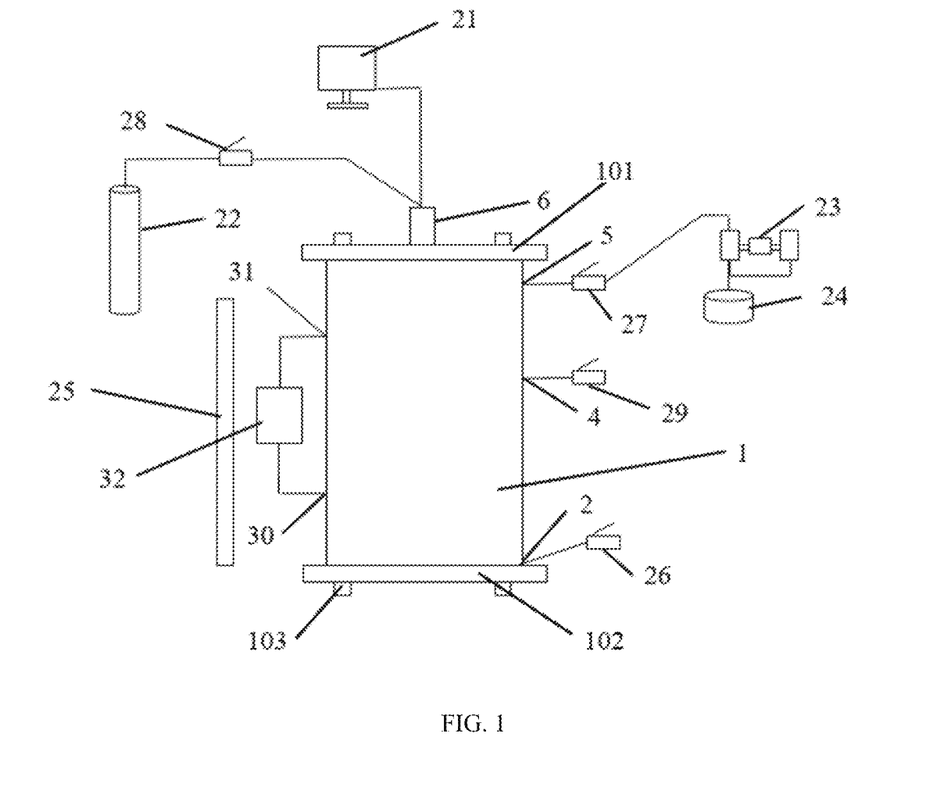
FIG. 1 illustrates a schematic plane diagram of an efficient generation and performance evaluation device of foam according to an embodiment of the disclosure.

The side wall of the reaction kettle 1 defines a circular hole C 5, and the circular hole C 5 is connected to the liquid storage tank 24. The valve B 27 and the screw pump 23 are disposed between the circular hole C 5 and the liquid storage tank 24, and the valve B 27 and the screw pump 23 are configured to be opened to make foam solution in the liquid storage tank 24 inject to the reaction kettle 1.

The side wall of the reaction kettle 1 includes: an outer side wall 104, a water bath insulation layer 105 and an inner side wall 106. The outer side wall 104 and the inner side wall 106 are fixedly connected to the upper kettle cover 101 and the lower kettle cover 102 of the reaction kettle 1, and the water bath insulation layer 105 is disposed in a gap defined between the outer side wall 104 and the inner side wall 106. An upper middle part of the outer side wall 104 defines a circular hole J 31, and a lower middle part of the outer side wall 104 defines a circular hole I 30. The circular hole I 30 is taken as a liquid inlet hole, the circular hole J 31 is taken as a liquid outlet hole, and the circular hole I 30 and the circular hole J 31 penetrate through the outer side wall 104, and are connected to the water bath thermostatic box 32. When a temperature of the water bath thermostatic box 32 is set to a first target temperature, a temperature of liquid filled in the water bath thermostatic box 32 is gradually changed. When a circulation function of the water bath thermostatic box 32 is opened, the liquid filled in the water bath thermostatic box 32 circulates between the water bath thermostatic box 32 and the water bath insulation layer 105 to change the temperature in the reaction kettle 1. A material of the outer side wall 104 is stainless steel, and a material of the inner side wall 106 is quartz.

A part of the outer side wall 104 is extended to the inner side wall 106 to be in seamless contact with the inner side wall 106, to thereby define a first groove 34, a tick mark 3 is disposed in the first groove 34 and the tick mark 3 is configured to observe a foaming height of the foam in the reaction kettle 1. Another part of the outer side wall 104 is extended to the inner side wall 106 to be in seamless contact with the inner side wall 106, to thereby define a second groove 13 symmetrical to the first groove 34, and the LED lamp 25 is configured to illuminate the first groove through the second groove 13 when the foaming height of the foam is observed. Materials at the first groove and the second groove are quartz.

The porous hollow steel circular plate 33 connected to the inner cylinder 9 includes: an inner circular plate 331 and a fixing ring 332. The inner circular plate 331 and the fixing ring 332 take a connection position between the inner circular plate 331 and the fixing ring 332 as a boundary, the inner circular plate 331 is disposed in the fixing ring 332 and is rotatably connected to the fixing ring 332, there is no gap between the inner circular plate 331 and the fixing ring 332, and the inner circular plate 331 is configured to rotate with the inner cylinder 9. The fixing ring 332 is sealed and fixed with the inner side wall 106 of the reaction kettle 1 to ensure no liquid leakage. The inner circular plate 331 defines multiple circular holes H 20 (i.e., first circular holes), and the circular holes H 20 penetrate through the inner circular plate 331. As shown in FIG. 4, sides of the circular holes H 20 on a bottom of the inner circular plate 331 are respectively fixed with the spring hinges 14, the spring hinges 14 are connected to the semicircular pieces 15, and the semicircular pieces 15 are disposed below the circular holes H 20 of the inner circular plate 331. Under elastic forces of the spring hinges 14, the semicircular pieces 15 are configured to seal the circular holes H 20 on the bottom of the inner circular plate 331 when there is no gas flow, and be flipped downwards under an impact of the gas.

A lower part of the side wall of the reaction kettle 1 defines a circular hole A 2, the circular hole A 2 is at a same height as a top end of the lower kettle cover 102 of the reaction kettle 1, and the circular hole A 2 is configured to discharge the foam and foam solution.

Figure 6:
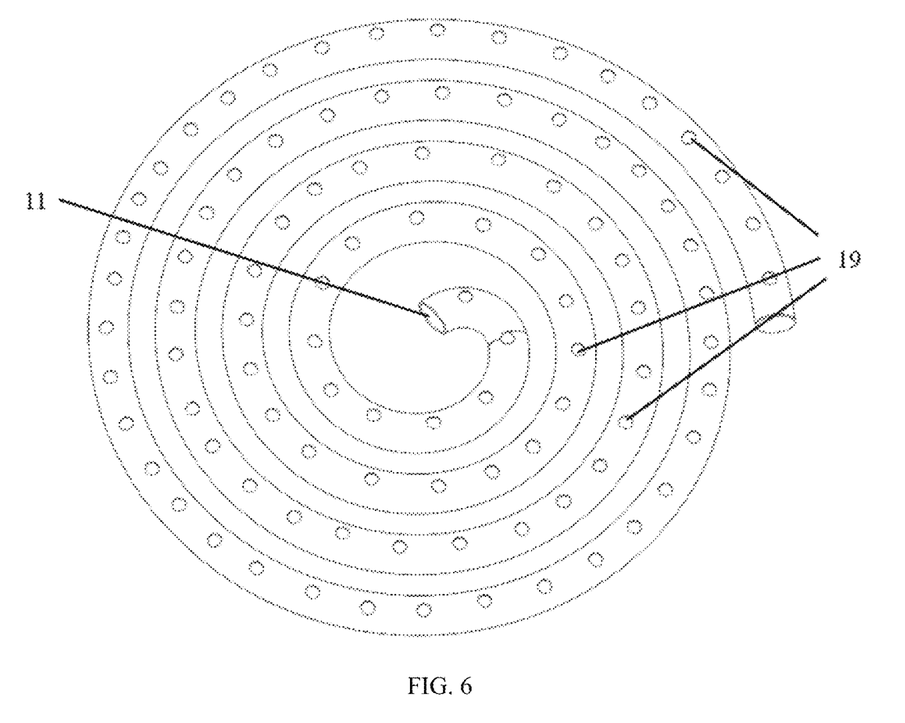
FIG. 6 illustrates a schematic structural diagram of a gas diffuser with vortex shape disposed above the porous hollow steel circular plate and relatively fixed with the porous hollow steel circular plate according to an embodiment of the disclosure.
Figure 7:
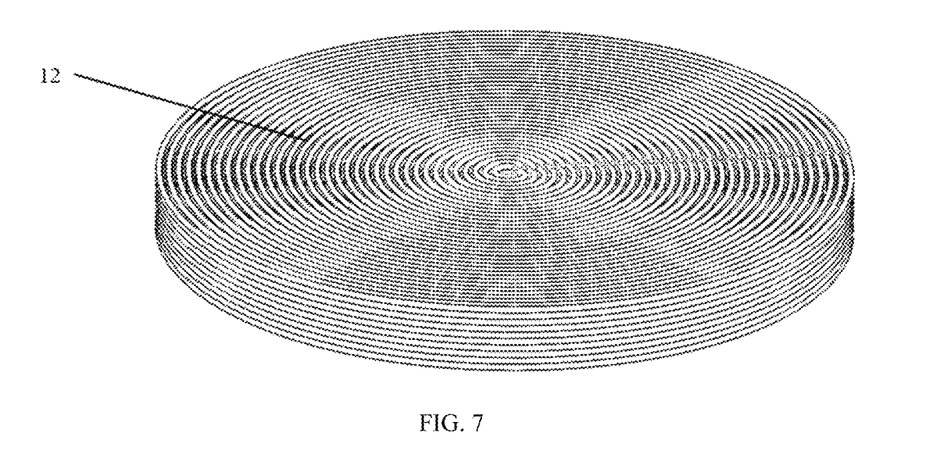
FIG. 7 illustrates a schematic three-dimensional structural diagram of a multiplayer spiral steel wire mesh installed in the porous hollow steel circular plate according to an embodiment of the disclosure.

The gas diffuser 10 is shown in FIG. 6, the connection column 18 defines a circular hole F 17, the gas diffuser 10 defines a circular hole E 11, and the circular hole F 17 is connected to the circular hole E 11. The circular hole F 17 is further connected with a circular hole D 7 defined on the rotator 6 through the gap of the connection column 18, and the circular hole D 7 is connected to the gas storage tank 22. The gas diffuser 10 is disposed above the porous hollow steel circular plate 33, and is fixed with the porous hollow steel circular plate 33, and the gas diffuser 10 and the porous hollow steel circular plate 33 are configured to rotate together in a relative static condition. A bottom of the gas diffuser 10 defines multiple circular holes G 19, and the circular holes G 19 are in communication with the circular holes H 20 of the porous hollow steel circular plate 33 in a vertical direction. When the valve C 28 is opened, gas flows to the circular hole D 7 through the gas storage tank 22, the gas from the circular hole D 7 flows to the circular hole E 11 through the gap of the connection column 18 and the circular hole F 17 sequentially, then the gas flows from the circular hole E 11 enters the porous hollow steel circular plate 33 through the circular holes G 19 and the circular holes H 20. The multilayer spiral steel wire mesh 12 is disposed in the porous hollow steel circular plate 33. The side wall of the reaction kettle 1 defines a circular hole B 4, and the valve D 29 is connected to the reaction kettle 1 through the circular hole B 4, and is configured to control gas discharge in the reaction kettle 1.

During use, the temperature of the water bath thermostatic box 32 is set, the circulation function of the water bath thermostatic box 32 is opened, and insulation liquid filled in the water bath thermostatic box 32 circulates between the water bath thermostatic box 32 and the water bath insulation layer 105. After the temperature of the reaction kettle 1 reaches a preset value (i.e., a second target value), the valve C 28 is opened, the gas flows from the gas storage tank 22 into the gas diffuser through the circular hole D, the gap of the connection column, the circular hole F, and the circular hole E sequentially, then the gas from the gas diffuser 10 enters the porous hollow steel circular plate 33 through the circular holes G 19 and the circular holes H 20. After the gas enters the porous hollow steel circular plate 33, the valve B 27 and the screw pump 23 are opened, the foam solution is injected into the reaction kettle 1 through the circular hole C 5, and the foam solution flows into the porous hollow steel circular plate 33 through the circular holes H 20.

After the foam solution and the gas flows into the porous hollow steel circular plate 33, the rotator 6 is opened, the porous hollow steel circular plate 33 and the gas diffuser 10 rotate together, and the gas collides with the foam solution under an action of the multilayer spiral steel wire mesh 12 in the porous hollow steel circular plate 33. The semicircular pieces 15 connected to the spring hinges 14 are opened under the impact of the gas, and the foam falls evenly to the bottom of the reaction kettle 1.

When the liquid in the liquid storage tank 24 is drained by the screw pump 23, the rotator 6, the gas storage tank 22 and the valve C 28 are closed, and the valve D 29 is opened to discharge the gas in the reaction kettle 1. A foaming volume is read according to the tick mark 3, and a half-life period of the foam is recorded after the foaming volume of the foam is reduced by half.

When an effect of pressure on a foamability and stability of the foam is studied, the circular hole B 4 is adjusted to control the pressure in a target value, to thereby determine the foamability and the stability of the foam under the high pressure.

When oil resistance and temperature resistance of the foam are determined, oil is mixed with the foam solution, the temperature of the water bath thermostatic box 32 is set as the first target value, a foaming volume and a half-life period of the foam are observed and recorded, to thereby determine the oil resistance and the temperature resistance of the foam.

When salt resistance and temperature resistance of the foam are determined, an inorganic salt is mixed with the foam solution, the temperature of the water bath thermostatic box 32 is set as the first target value, a foaming volume and a half-life period of the foam are observed and recorded, to thereby determine the salt resistance and the temperature resistance of the foam.

When determinations are finished, the foam in the reaction kettle 1 stands for a period of time, the gas storage tank 22 and the valve C 28 are opened after the foam disappears, and a valve A 26 connected to the circular hole A 2 is opened to completely discharge the foam solution by the pressure.

When it is not necessary to determine the performances of the foam but only to obtain a large amount of the foam, the efficient generation and performance evaluation device of the foam is used as an efficient generation device of the foam, and the foam is generated by continuously adding the foam solution and the gas, and is discharged from the circular hole A 2.

What is claimed is:

1. A generation and performance evaluation device of foam, configured to generate the foam, and to evaluate performance of the foam at the same time; and the generation and performance evaluation device of foam comprising: a reaction kettle, a temperature resistant silicone rubber sealing ring, screws, a water bath thermostatic box, a porous hollow steel circular plate, a rotator, a connection column, a bearing, a multilayer spiral steel wire mesh, spring hinges, semicircular pieces, a gas diffuser with vortex shape, a light-emitting diode (LED) lamp, valves, a screw pump, a pressure transmitter, a temperature transmitter, a liquid storage tank, a gas storage tank, and a computer terminal; wherein the valves comprise: a first valve, a second valve, and a third valve;

wherein the reaction kettle comprises: an upper kettle cover and a lower kettle cover; the upper kettle cover of the reaction kettle is sealed with a side wall of the reaction kettle through the temperature resistant silicone rubber sealing ring, and the upper kettle cover and the lower kettle cover of the reaction kettle are compacted on the side wall of the reaction kettle through the screws, to thereby prevent gas leakage; the rotator is disposed above the upper kettle cover, and the connection column is disposed below the rotator; and the connection column comprises: an inner cylinder and an outer ring, and a gap is defined between the inner cylinder and the outer ring, and is configured to flow gas into the gas diffuser;

wherein an outer side of the outer ring is welded to a center of the upper kettle cover of the reaction kettle, the bearing is disposed in the rotator, an upper end of the inner cylinder is connected to the bearing in the rotator, a lower end of the inner cylinder is connected to the porous hollow steel circular plate; the rotator is configured to drive the inner cylinder and the porous hollow steel circular plate to rotate together; and the inner cylinder is connected to the temperature transmitter and the pressure transmitter, and the temperature transmitter and the pressure transmitter are connected to the computer terminal, and are configured to measure a temperature and a pressure in the reaction kettle in real-time, respectively;

wherein the side wall of the reaction kettle defines a circular hole C, and the circular hole C is connected to the liquid storage tank, the first valve and the screw pump are disposed between the circular hole C and the liquid storage tank, and the first valve and the screw pump are configured to be opened to make foam solution in the liquid storage tank inject to the reaction kettle;

wherein the side wall of the reaction kettle comprises: an outer side wall, a water bath insulation layer and an inner side wall, the outer side wall and the inner side wall are fixedly connected to the upper kettle cover and the lower kettle cover of the reaction kettle, and the water bath insulation layer is disposed in a gap defined between the outer side wall and the inner side wall; an upper middle part of the outer side wall defines a circular hole J, and a lower middle part of the outer side wall defines a circular hole I, the circular hole I is taken as a liquid inlet hole, the circular hole J is taken as a liquid outlet hole, and the circular hole I and the circular hole J penetrate through the outer side wall, and are connected to the water bath thermostatic box; when a temperature of the water bath thermostatic box is set to a first target value, a temperature of liquid filled in the water bath thermostatic box is gradually changed, and when a circulation function of the water bath thermostatic box is opened, the liquid filled in the water bath thermostatic box circulates between the water bath thermostatic box and the water bath insulation layer to change a temperature in the reaction kettle; and a material of the outer side wall is stainless steel, and a material of the inner side wall is quartz;

wherein a part of the outer side wall is extended to the inner side wall to be in seamless contact with the inner side wall, to thereby define a first groove, a tick mark is disposed in the first groove and the tick mark is configured to observe a foaming height of the foam in the reaction kettle; another part of the outer side wall is extended to the inner side wall to be in seamless contact with the inner side wall, to thereby define a second groove symmetrical to the first groove, and the LED lamp is configured to illuminate the first groove through the second groove when the foaming height of the foam is observed; and materials at the first groove and the second groove are quartz;

wherein the porous hollow steel circular plate connected to the inner cylinder comprises: an inner circular plate and a fixing ring, the inner circular plate is disposed in the fixing ring and is rotatably connected to the fixing ring without leakage, and the inner circular plate is configured to rotate with the inner cylinder; the fixing ring is sealed and fixed with the inner side wall of the reaction kettle without liquid leakage; the inner circular plate defines a plurality of circular holes H, and the plurality of circular holes H penetrate through the inner circular plate; sides of the plurality of circular holes H on a bottom of the inner circular plate are respectively fixed with the spring hinges, the spring hinges are respectively connected to the semicircular pieces, and the semicircular pieces are disposed below the plurality of circular holes H of the inner circular plate; and under elastic forces of the spring hinges, the semicircular pieces are configured to seal the circular holes H on the bottom of the inner circular plate when there is no gas flow, and the semicircular pieces are configured to be flipped downwards under an impact of the gas;

wherein a lower part of the side wall of the reaction kettle defines a circular hole A, the circular hole A is at a same height as a top end of the lower kettle cover of the reaction kettle, and the circular hole A is configured to discharge the foam and the foam solution;

wherein the gas diffuser with vortex shape is a vortex-shaped circular tube, a vortex surface of the gas diffuser with vortex shape defines a plurality of circular holes G facing downward to thereby disperse gas; and wherein the connection column defines a circular hole F, the gas diffuser defines a circular hole E, and the circular hole F is connected to the circular hole E; the circular hole F is further connected with a circular hole D defined on the rotator through the gap of the connection column, and the circular hole D is connected to the gas storage tank; the gas diffuser is disposed above the porous hollow steel circular plate and is fixed with the porous hollow steel circular plate, and the gas diffuser and the porous hollow steel circular plate are configured to rotate together in a relative static condition; a bottom of the gas diffuser defines the plurality of circular holes G, and the plurality of circular holes G are in communication with the plurality of circular holes H of the porous hollow steel circular plate in a vertical direction; when the second valve is opened, gas flows to the circular hole D through the gas storage tank, the gas from the circular hole D flows to the circular hole E through the gap of the connection column and the circular hole F sequentially, then the gas from the circular hole E enters the porous hollow steel circular plate through the plurality of circular holes G and the plurality of circular holes H; the multilayer spiral steel wire mesh is disposed in the porous hollow steel circular plate, and the multilayer spiral steel wire mesh is stacked and fixed by multilayer dense spiral steel wire mesh to increase the contact area between gas and liquid; the side wall of the reaction kettle defines a circular hole B, and the third valve is connected to the reaction kettle through the circular hole B, and is configured to control gas discharge in the rection kettle.

2. A method for generating foam under high temperature and high pressure, performed by a generation and performance evaluation device of foam, comprising:

when using the generation and performance evaluation device of the foam, the temperature of the water bath thermostatic box is set, the circulation function of the water bath thermostatic box is opened, and the liquid filled in the water bath thermostatic box circulates between the water bath thermostatic box and the water bath insulation layer; after the temperature in the reaction kettle reaches a second target value, the second valve is opened, the gas flows from the gas storage tank into the gas diffuser through the circular hole D, the gap of the connection column, the circular hole F, and the circular hole E sequentially, then the gas from the gas diffuser enters the porous hollow steel circular plate through the plurality of circular holes G and the plurality of circular holes H; after the gas enters the porous hollow steel circular plate, the first valve and the screw pump are opened, the foam solution is injected into the reaction kettle through the circular hole C, and the foam solution flows into the porous hollow steel circular plate through plurality of circular holes H;

after the foam solution flows into the porous hollow steel circular plate, the rotator is opened, the porous hollow steel circular plate and the gas diffuser rotate together, the gas in the porous hollow steel circular plate is rotated, and the gas collides with the foam solution under an action of the multilayer spiral steel wire mesh in the porous hollow steel circular plate; and the semicircular pieces connected to the spring hinges are opened under the impact of the gas, and the foam falls evenly to the bottom of the reaction kettle;

when liquid in the liquid storage tank is drained by the screw pump, the rotator, the gas storage tank and the second valve are closed, and the third valve is opened to discharge the gas in the reaction kettle; and a foaming volume is read according to the tick mark, and a half-life period of the foam is recorded after the foaming volume of the foam is reduced by half;

when an effect of pressure on a foamability and stability of the foam is determined, the circular hole B is adjusted to control the pressure in a target value, to thereby determine the foamability and the stability of the foam under the pressure;

when oil resistance and temperature resistance of the foam are determined, oil is mixed with the foam solution, the temperature of the water bath thermostatic box is set as the first target value, a foaming volume and a half-life period of the foam are observed and recorded, to thereby determine the oil resistance and the temperature resistance of the foam;

when salt resistance and temperature resistance of the foam are determined, an inorganic salt is mixed with the foam solution, the temperature of the water bath thermostatic box is set as the first target value, a foaming volume and a half-life period of the foam are observed and recorded, to thereby determine the salt resistance and the temperature resistance of the foam; and when determinations are finished, the foam in the reaction kettle stands for a period of time, the gas storage tank and the second valve are opened after the foam disappears, and a fourth valve of the valves connected to the circular hole A is opened to discharge the foam solution by the pressure.

3. The method of claim 2, wherein the contact area between the gas and the liquid is increased when the gas and the liquid flow to the multilayer spiral steel wire mesh in the porous hollow steel circular plate, under the rotation of the porous hollow steel circular plate and the gas diffuser, the gas generates a swirling flow, and is in full contact with the foam solution, to thereby generate the foam; and the semicircular plates are opened under the impact of the gas, and the semicircular plates are closed without the gas flow, to thereby avoid the foam solution falling to the bottom of the reaction kettle without forming foam, and make the foam fall evenly on the bottom of the reaction kettle.

4. The method of claim 2, wherein when oil resistance and temperature resistance of the foam are determined, the temperature of the water bath thermostatic box is raised, the second valve is opened after the temperature in the reaction kettle reaches to a second target value, the gas enters the reaction kettle from the circular hole D, the oil is fully mixed with the foam solution to obtain a mixture, and the mixture is injected into the reaction kettle through the circular hole C, the rotator is opened to make the gas in full contact with the mixture to generate foam, a foaming volume and a half-life period of the foam are observed to determine the oil resistance and the temperature resistance; and when salt resistance and the temperature resistance of the foam are determined, an inorganic salt is fully mixed with the foam solution to obtain a mixture, and the mixture is injected into the reaction kettle through the circular hole C, the rotator is opened to make the gas in full contact with the mixture to generate foam, a foaming volume and a half-life period of the foam are observed.

5. The method of claim 2, wherein when the generation and performance evaluation device of foam is used as a foam generator, the generation and performance evaluation device of the foam is operated to generate the foam by continuously adding the foam solution and the gas, and discharge the foam from the circular hole A.

* * * * *